United States Patent
McGrath et al.

(10) Patent No.: US 11,053,858 B2
(45) Date of Patent: Jul. 6, 2021

(54) LOW LEAKAGE SEAL FOR TOWER SHAFT

(71) Applicant: United Technologies Corporation, Farmington, CT (US)

(72) Inventors: Rachel A. McGrath, Hartford, CT (US); William N. Green, East Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 94 days.

(21) Appl. No.: 16/269,686

(22) Filed: Feb. 7, 2019

(65) Prior Publication Data

US 2020/0256257 A1  Aug. 13, 2020

(51) Int. Cl.
*F02C 7/28* (2006.01)

(52) U.S. Cl.
CPC ............ *F02C 7/28* (2013.01); *F05D 2240/50* (2013.01); *F05D 2240/60* (2013.01)

(58) Field of Classification Search
CPC ...... F02C 7/28; F02C 7/32; F02C 7/36; F02C 7/00; F02C 3/107; F02C 3/13; F05D 2240/50–51; F05D 2240/52–55; F05D 2240/60–63
USPC ........................................................ 277/358
See application file for complete search history.

(56) References Cited

U.S. PATENT DOCUMENTS

| | | | | |
|---|---|---|---|---|
| 5,503,407 A * | 4/1996 | McNickle | ............ | F16J 15/002 277/348 |
| 8,042,341 B2 * | 10/2011 | Charier | ................. | F01D 25/183 60/788 |
| 8,049,386 B2 * | 11/2011 | Vanderzyden | ........ | F01D 11/003 310/88 |
| 8,237,298 B2 * | 8/2012 | Lemmers, Jr. | ............ | F02C 7/32 192/66.1 |
| 9,611,787 B2 * | 4/2017 | Wotzak | ...................... | F02C 7/36 |
| 2005/0183540 A1 * | 8/2005 | Miller | ........................ | F02C 7/32 74/665 GA |
| 2006/0207834 A1 * | 9/2006 | Giesler | ................. | F01D 25/183 184/65 |
| 2009/0205341 A1 * | 8/2009 | Muldoon | .................. | F02C 7/32 60/792 |
| 2015/0014937 A1 * | 1/2015 | Behrman | ............. | F16J 15/3244 277/351 |

(Continued)

FOREIGN PATENT DOCUMENTS

| | | |
|---|---|---|
| EP | 3418501 A1 | 12/2018 |
| EP | 3623588 A1 | 3/2020 |

OTHER PUBLICATIONS

European search report for patent application No. 19 21 3988 dated Jun. 18, 2020.

*Primary Examiner* — Nathan Cumar
(74) *Attorney, Agent, or Firm* — Bachman & LaPointe, PC

(57) ABSTRACT

A gas turbine engine includes a shaft compartment containing at least one main shaft which rotates about a main axis of rotation; and a tower shaft engaged with the at least one main shaft for rotation about a tower shaft axis of rotation, the tower shaft being mounted in a bearing compartment extending away from the shaft compartment, wherein the bearing compartment is sealed against leakage from inside the bearing compartment to ambient. The seal can be produced using a tower shaft seal held in a seal housing and sealing against one or more faces of the tower shaft assembly or components.

7 Claims, 4 Drawing Sheets

(56) References Cited

U.S. PATENT DOCUMENTS

2017/0299062 A1* 10/2017 Blais .................... F16J 15/3464
2018/0291960 A1* 10/2018 Anglin ................... F16C 33/78

* cited by examiner

LOW LEAKAGE SEAL FOR TOWER SHAFT

U.S. GOVERNMENT RIGHTS

This invention was made with Government support awarded by the United States. The Government has certain rights in this invention.

BACKGROUND

The present disclosure relates to a tower shaft for a gas turbine engine and, more particularly, to a low leakage seal for the tower shaft.

Gas turbine engines, especially gas turbine engines for aircraft, very often include a mechanically driven accessory gearbox for driving accessory systems such as fuel pumps, scavenge pumps, electrical generators, hydraulic pumps, etc. Power requirements for such accessory gearbox increase as the number of electrical systems within the aircraft increase. The accessory gearbox is typically driven by a tower shaft, which can be engaged with a main shaft or spool of the engine, and rotate around an axis which is at an angle to the main shaft, commonly nearly perpendicular to the main shaft axis.

Main shaft seals are used to preserve pressure in specific areas of the main or shaft compartment in which the main shaft rotates. At the location of a tower shaft, a bearing compartment typically contains oil which is maintained at a relatively lower pressure than air which is in the shaft compartment. Nevertheless, the shaft compartment is preferably sealed against leakage. Known tower shaft assemblies do not tightly seal the tower shaft and associated bearing compartment. In fact, the bearing compartments for tower shafts are typically vented to ambient or other relatively low pressure conditions outside of the bearing compartment. This results in the main shaft seals being subjected to a large pressure difference, that is, the pressure difference between pressure in the shaft compartment on one side of the seal, and pressure in the bearing compartment on the other, which will be ambient.

Further, high pressure seals which would be used to address the large pressure difference generate more heat than lower pressure seals, and this requires more oil to prevent coking and can impact engine performance.

The present disclosure addresses this issue.

SUMMARY OF THE INVENTION

In one disclosed embodiment, a gas turbine engine comprises a shaft compartment containing at least one main shaft which rotates about a main axis of rotation; and a tower shaft engaged with the at least one main shaft for rotation about a tower shaft axis of rotation, the tower shaft being mounted in a bearing compartment extending away from the shaft compartment, wherein the bearing compartment is sealed against leakage from inside the bearing compartment to outside the bearing compartment.

In a non-limiting configuration, the bearing compartment is sealed against pressure leakage where the tower shaft extends out of the bearing compartment.

In a further non-limiting configuration, a seal housing is mounted to the bearing compartment, and a tower shaft seal is mounted in the seal housing and sealing against the tower shaft.

In another non-limiting configuration, a spring member is positioned within the seal housing for exerting a bias force against the seal toward the tower shaft.

In still another non-limiting configuration, the seal housing has a recessed area and the spring member is positioned in the recessed area.

In yet another non-limiting configuration, the tower shaft further comprises a bearing sleeve, and the tower shaft seal is positioned to seal against the bearing sleeve.

In another non-limiting configuration, the bearing sleeve rotates with the tower shaft, and rotates relative to the tower shaft seal.

In a further non-limiting configuration, the bearing sleeve has an end face, and the tower shaft seal is engaged against the end face.

In another non-limiting configuration, the tower shaft seal is a carbon seal.

In another non-limiting configuration, the tower shaft seal seals against an end face and a side face of the tower shaft.

In a further non-limiting configuration, a method for sealing a bearing compartment of a tower shaft of a gas turbine engine comprises positioning a tower shaft seal between a seal housing mounted to an engine casing, and the tower shaft, whereby the tower shaft seal seals the bearing compartment against leakage from the bearing compartment to outside of the bearing compartment.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

A detailed description of preferred embodiments of the present disclosure follows, with referenced to the attached drawings, wherein.

Like reference numbers and designations in the various drawings indicate like elements.

DETAILED DESCRIPTION

The disclosure relates to a gas turbine engine and, more particularly, to a gas turbine engine having a tower shaft and a tower shaft seal for sealing the bearing compartment of the tower shaft.

Figure 1:
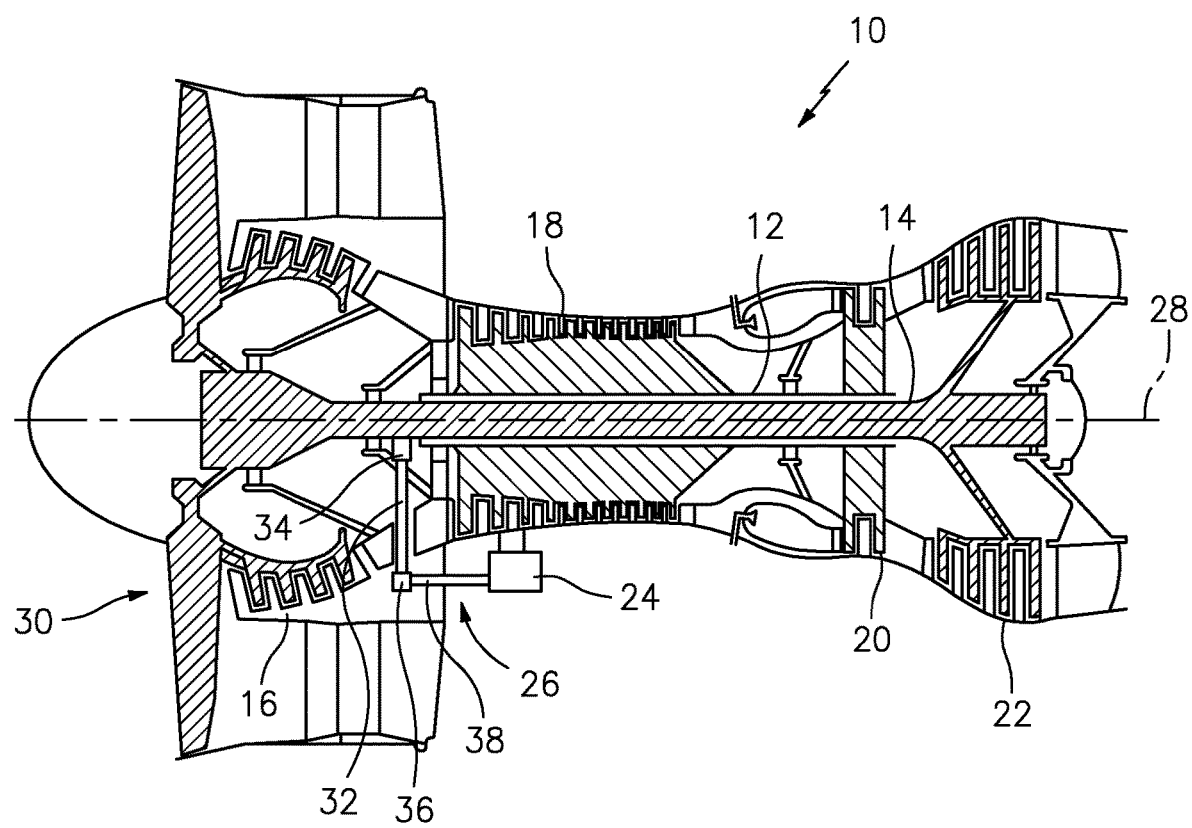
FIG. 1 illustrates a gas turbine engine having a tower shaft.

Referring to FIG. 1, a gas turbine engine 10 is diagrammatically shown. The engine 10 includes a high-pressure drive shaft 12, a low-pressure drive shaft 14, a low-pressure compressor 16, a high-pressure compressor 18, a high-pressure turbine 20, a low-pressure turbine 22, an accessory gearbox 24, and a mechanical drive system 26 for the accessory gearbox 24. The drive shafts 12, 14, compressor sections 16, 18, and turbine sections 20,22 are centered about an axially extending engine centerline 28.

The low-pressure compressor 16 is disposed axially forward of the high-pressure compressor 18, and the high pressure turbine 20 is positioned forward of the low-pressure turbine 22. The terms "forward" and "aft" are used to indicate position along the axially extending engine centerline 28. A first component "forward" of a second component is positioned closer to the inlet 30 of the engine 10. The second component is positioned "aft" of the first component. In most instances, gas flow traveling through the core of the engine 10 encounters the forward component before it encounters the aft component. The low-pressure and high-pressure compressor sections 16, 18 and the high and low pressure turbine sections 20,22 each includes a plurality of stator and rotor stages.

The high-pressure drive shaft 12 is connected to and extends between the high-pressure compressor 18 and the high-pressure turbine 20. The low-pressure drive shaft 14 is connected to and extends between the low-pressure compressor 16 and the low-pressure turbine 22. The high-pressure drive shaft 12 and the low-pressure drive shaft 14 rotate about the axially extending engine centerline 28. The drive shafts 12, 14 are diagrammatically shown in FIG. 1 as concentric cylinders to simply illustrate the relationship between the components. Most low pressure and high pressure drive shafts 12, 14 are concentric, but have relatively complex geometries to accommodate all of the various components attached or disposed adjacent the drive shafts 12, 14. The portions of the drive shafts 12, 14 shown in FIG. 2 are illustrated with geometries more typical of those actually used within gas turbine engines.

Figure 2:
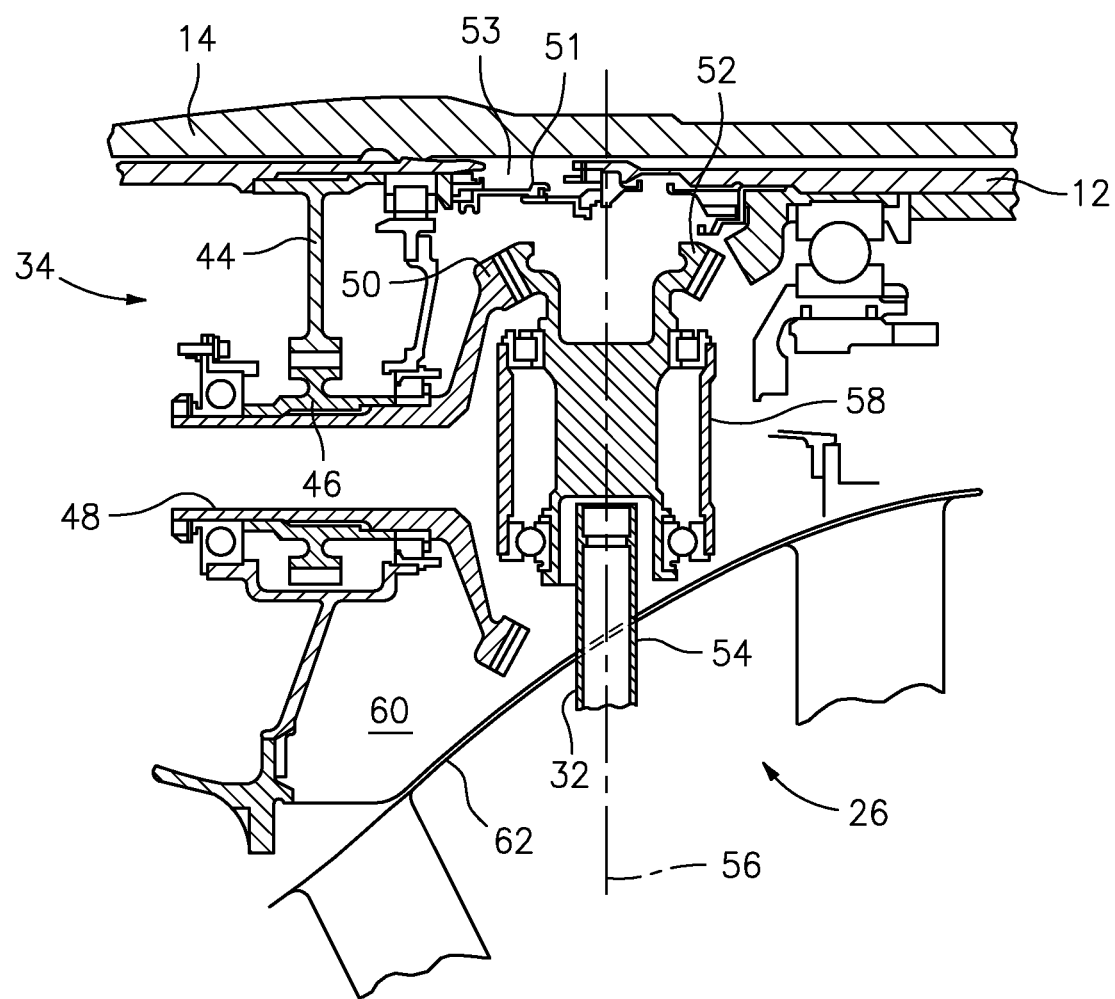
FIG. 2 is an enlarged portion of FIG. 1 showing a non-limiting embodiment of the tower shaft in further detail.

Referring to FIGS. 1 and 2, in one non-limiting example, the mechanical drive system 26 for the accessory gearbox 24 includes a tower shaft 32, a low-pressure drive shaft gear arrangement 34 ("LPDS gear arrangement"), an angle gear arrangement 36, and a lay shaft 38. The LPDS gear arrangement 34 can assume a variety of embodiments. In a first embodiment (see FIG. 2), the LPDS gear arrangement 34 includes a first bevel gear 50 and a second bevel gear 52. The first bevel gear 50 is fixed (e.g., by one or more splines) to the low speed drive shaft 14. The first bevel gear 50 includes a plurality of gear teeth oriented to engage the second bevel gear 52. The second bevel gear 52 is fixed to the tower shaft 32. Of course, the mechanical drive system 26 could alternatively include different components, for example angle gear arrangement 36 and/or lay shaft 38 could be omitted, and other components may or may not be substituted.

The tower shaft 32 has a body 54 that is rotatable about a lengthwise extending axis 56. The tower shaft 32 may be a unitary shaft or it may include multiple sections connected together (e.g., by splines, etc.). The tower shaft 32 is typically oriented perpendicular to, or at a slight angle from perpendicular to, the engine centerline 28. In some embodiments, the tower shaft 32 includes one or more bearing mounts 58 to positionally locate the tower shaft 32 and to facilitate rotation of the tower shaft 32. As indicated above, the second bevel gear 52 is fixed to one end of the tower shaft 32.

Typically, the environment surrounding tower shaft 32, for example the bearing compartment generally indicated at 60, is not sealed or at least not tightly sealed, and is therefore open to ambient conditions outside of the engine case 62, or to otherwise lower pressure areas or conditions, which likewise lead to lower pressure in the bearing compartment 60. This bearing compartment 60 is typically bounded by an inner surface of the engine casing at a generally radially outward boundary, by an outer surface of the main shaft structure at a generally radially inward boundary, a plurality of main shaft seals which can define the axial ends of the bearing compartment 60, as well as one or more central points of communication between the bearing compartment 60 and the main or shaft compartment 53 (See FIG. 2), and according to the present disclosure, by a tower shaft seal which seals the outer engine casing where the tower shaft passes through to outside of the engine casing to operate whatever auxiliary device is desired. Since there is typically little or no seal where the tower shaft passes through the engine casing, there is significant leakage at this area, and pressure in the bearing compartment 60 is generally about the same as ambient pressure outside the engine casing. Again, as referred to herein, ambient pressure outside the engine casing refers to various different areas or conditions of pressure which are generally lower than pressure within the main or shaft compartment 53, where buffer air and other higher pressures generated by operation of the gas turbine engine are present.

On the other hand, pressure within the main shaft compartment 53 or casing, for example upstream or forward of the connection to tower shaft 32, or radially inwardly from the bearing compartment 60, can be at elevated air pressures during operation, and this pressure can be maintained for example by using one or more main seals between the shaft compartment 53 and the bearing compartment 60. Thus, with the bearing compartment 60 of the tower shaft open to ambient, a large delta in pressure can be present across the main seals as mentioned above.

FIG. 2 shows one set of main seals 51 at an intermediate location and sealing between the shaft compartment 53 radially inward from seal 51, and the bearing compartment 60. It should be appreciated that additional main seals would likely also be utilized, for example at axial ends of bearing compartment 60 at locations which would be off respectively the left and right sides of the illustration of FIG. 2.

Figure 3:
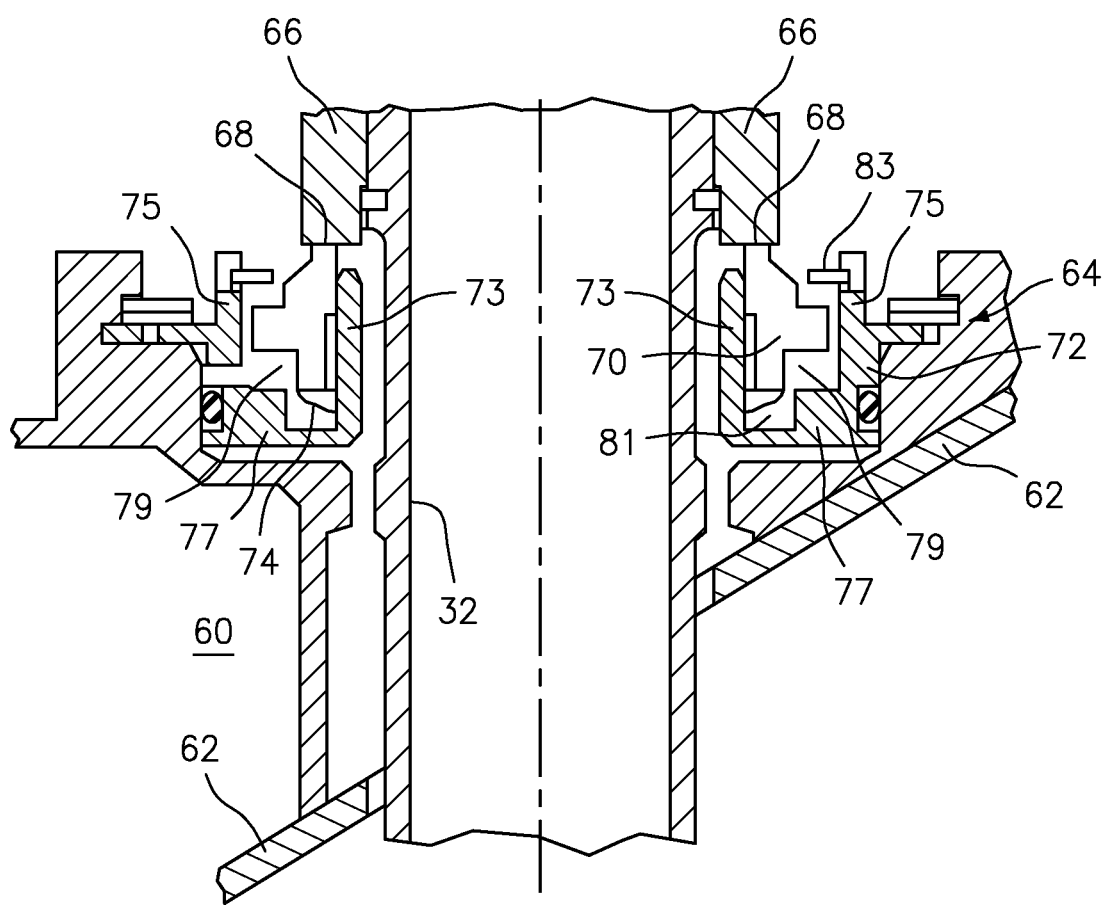
FIG. 3 shows a cross-section taken through a tower shaft seal according to one non-limiting embodiment of the disclosure.

FIG. 3 shows a portion of tower shaft 32 where it approaches and passes through engine case 62, and illustrates a tower shaft seal 64 which produces a tight seal of the bearing compartment 60 against ambient conditions outside the bearing compartment. This helps to maintain an elevated pressure in the bearing compartment 60 which is closer to the pressure in the shaft compartment 53, and thereby greatly reduces or even eliminates the delta in pressure across the main seals 51.

FIG. 3 shows tower shaft 32 mounted within a bearing sleeve 66 which holds shaft 32 and rotates with shaft 32 in the bearing mount 58 (FIG. 2). Bearing sleeve 66 has an end face 68, which can be a smooth, flat edge, or which can have alternative shapes as well.

Tower shaft seal 64 in this non-limiting embodiment has a seal member 70, which can for example be a carbon seal or a seal fabricated from any other materials which can advantageously seal in a durable manner between a rotating surface and a fixed surface. Seal member 70 can be mounted within a seal housing 72 which can be fixed relative to engine casing 62. Seal housing 72 can be any suitable structure which supports seal 70 in position relative to the tower shaft, and can have a radially inner wall 73 and a radially outer wall 75, with a floor 77 connecting wall 73 and wall 75. Walls 73, 75 can have a space 79 defined therebetween for receiving seal 70.

Floor 77 can have a recessed portion 81 defining a space for a spring member 74 as will be discussed below.

Seal housing 72 can be mounted to engine casing 62 in any suitable manner, but preferably in such a way that housing 72 is sealed to casing 62 so that the only passage through seal housing 72 and engine casing 62 to ambient is around seal 70.

A retainer 83 can also be positioned in housing 72 to hold seal 70 within space 79, and in proper position to seal against the tower shaft.

As can be appreciated, a carbon seal 70 biased against end face 68 of shaft 32 serves to produce a tight seal at this area, thereby reducing leakage to ambient, maintaining an elevated pressure in the bearing compartment 60, and reducing a pressure drop or delta in pressure across the main housing seals.

In order to maintain a good seal between seal member 70 and end face 68 of bearing sleeve 66, a spring member 74, for example a wave spring, can be positioned within seal housing 72, for example in recess 81, to bias seal member 70 toward end face 68 of bearing sleeve 66. This helps to produce a tight seal of the bearing compartment 60 as desired.

Figure 4:
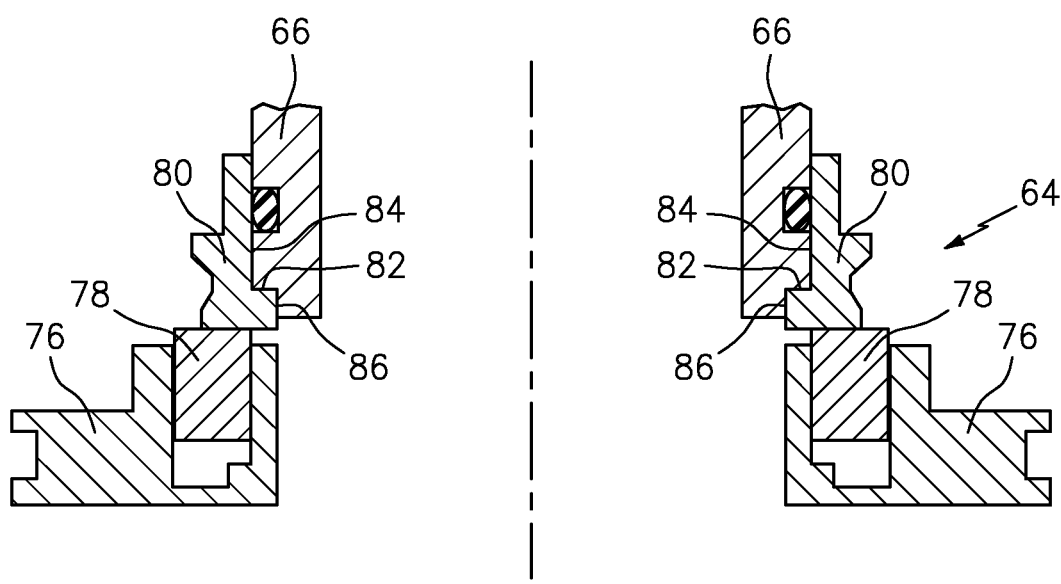
FIG. 4 shows a cross-section taken through a tower shaft seal according to another non-limiting embodiment of the disclosure.

FIG. 4 shows an alternative embodiment of tower shaft seal 64 wherein a seal housing 76 holds a seal block 78 which abuts against a seal member 80 which engages both an end face 82 and radially outwardly facing surfaces 84, 86 of bearing sleeve 66. This structure likewise is effective at producing a tight seal of this aspect of the tower shaft, and thereby seal the bearing compartment 60 of the tower shaft as desired. Seal block 78, in similar fashion to wave spring 74 of FIG. 3, serves to bias seal member 80 against bearing sleeve 66 to further improve the sealing qualities of the seal of this configuration.

It should be appreciated that although specific embodiments of seals for the bearing compartment of a tower shaft have been disclosed, other seal structures could be utilized in this location as well, and such different seal structures are considered to be within the broad scope of this disclosure.

It should also be appreciated that the present disclosure provides a method whereby a tower shaft seal can be positioned to seal against a tower shaft and seal the location where the tower shaft passes through an engine casing against pressure leakage at this point. Positioning of the tower shaft seal in this location helps to maintain an elevated pressure within the bearing compartment of the tower shaft, and thereby reduces a pressure difference between the bearing compartment and the shaft compartment of the engine. This reduction in pressure difference subjects the main seals 51 to an accordingly reduced pressure difference, which addresses the problems with known tower shaft structure for gas turbine engines as discussed above.

It should be appreciated that the tower seal assembly disclosed herein addresses the issues raised in connection with a large delta in pressure across the main seals 51 of a gas turbine engine, and thereby reduces heat, friction and other undesirable issues in tower shaft assemblies having a bearing compartment open to ambient conditions. Further, with this configuration, a relatively loose main seal can be utilized at the location of main seals 51, which is less complicated and produces less heat, all as desired.

One or more embodiments of the present invention have been described. Nevertheless, it will be understood that various modifications may be made without departing from the spirit and scope of the invention. For example, the disclosed tower shaft seal can be mounted in alternative manners, and can be provided as different forms or fabrications of seals and produce benefits from such application as well. Accordingly, other embodiments are within the scope of the following claims.

What is claimed is:

1. A gas turbine engine, comprising:
   an engine case defining an engine interior space;
   a shaft compartment containing at least one main shaft which rotates about a main axis of rotation, the shaft compartment being within the interior space; and
   a tower shaft engaged with the at least one main shaft for rotation about a tower shaft axis of rotation, the tower shaft being mounted in a bearing compartment extending away from the shaft compartment and through the engine case, wherein the bearing compartment is sealed against leakage from inside the bearing compartment to outside of the bearing compartment,
   further comprising a sea housing mounted to the bearing compartment, and a seal member mounted in the seal housing and sealing against a bearing sleeve axial end face of the tower shaft,
   further comprising a spring member positioned within the seal housing for exerting a bias force against the seal member toward the bearing sleeve axial end face of the tower shaft, and
   wherein the seal housing has a recessed area and the spring member is positioned in the recessed area.

2. The gas turbine engine according to claim 1, wherein the bearing compartment is sealed against pressure leakage where the tower shaft extends out of the bearing compartment.

3. The gas turbine engine of claim 1, wherein the tower shaft further comprises a bearing sleeve, and wherein a tower shaft seal is positioned to seal against the bearing sleeve.

4. The gas turbine engine of claim 3, wherein the bearing sleeve rotates with the tower shaft, and rotates relative to the tower shaft seal.

5. The gas turbine engine according to claim 1, wherein the seal member is a carbon seal.

6. The gas turbine engine according to claim 1, wherein the seal member seals against the axial end face and a side face of the bearing sleeve.

7. A method for sealing a bearing compartment of a tower shaft of a gas turbine engine, the bearing compartment being defined in part by an engine case of the gas turbine engine, the method comprising positioning a tower shaft seal between the engine case and the tower shaft, whereby the tower shaft seal seals the bearing compartment against leakage from the bearing compartment, through the engine case, and to outside of the bearing compartment,
   further comprising a seal housing mounted to the bearing compartment, and a seal member mounted in the seal housing and sealing against a bearing sleeve axial end face of the tower shaft,
   further comprising a spring member positioned within the seal housing for exerting a bias force against the seal member toward the bearing sleeve axial end face of the tower shaft, and
   wherein the seal housing has a recessed area and the spring member is positioned in the recessed area.

\* \* \* \* \*